April 7, 1936.  D. G. LITTLE  2,036,285
BRUSHHOLDER
Filed Jan. 31, 1935
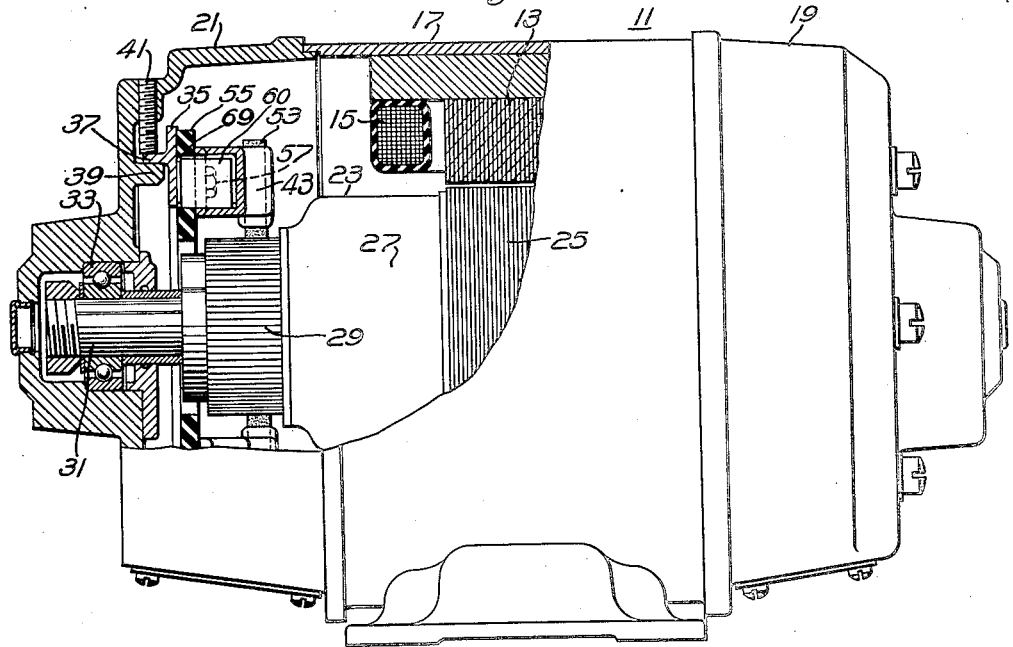
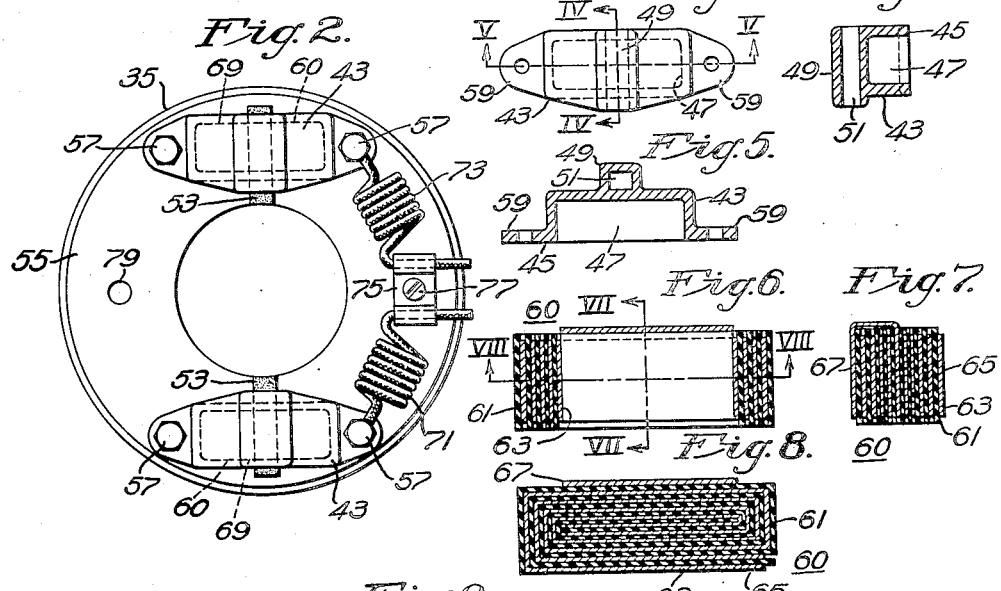
WITNESSES:
INVENTOR
Donald G. Little.
BY
ATTORNEY Patented Apr. 7, 1936

2,036,285

UNITED STATES PATENT OFFICE 2,036,285

BRUSH HOLDER

Donald G. Little, Longmeadow, Mass., assignor to Westinghouse Electric & Manufacturing Company, East Pittsburgh, Pa., a corporation of Pennsylvania Application January 31, 1935, Serial No. 4,283

7 Claims. (Cl. 171—324)

My invention relates to electric machines and particularly to commutator type dynamo electric machines.

An object of my invention is to provide a relatively simple, compact and inexpensive means applicable to a commutator type dynamo electric machine to reduce or to prevent radio interference by a machine.

Another object of my invention is to provide a simple and easily installed brush-holder assembly comprising a pair or capacitors and reactors so connected to the machine and to the circuit thereof as to greatly reduce or entirely prevent interference with radio receiving apparatus.

Another object of my invention is to provide a radio frequency filter of the most effective type in combination with a brush-holder assembly and a dynamo-electric machine.

Other objects of my invention will either be apparent from a description of one form of device embodying my invention or will be pointed out in the course of such description.

In practicing my invention, I provide, in combination, with a dynamo electric machine having a commutator type rotor, a rocker ring, preferably made of metal, a flat ring of electric-insulating material located adjacent to the rocker ring, and a pair of metal brushholders secured to the flat ring of electric-insulating material. Each brushholder has a recess in its rear face to receive and tightly hold a condenser which is so designed and constructed that one terminal is in electrical engagement with the metal brushholder and the other terminal is in electrical engagement with the metal rocker ring. Current conducting leads connected to the brushholders are formed to constitute reactors, one for each brushholder.

In the single sheet of drawings,

Figure 1 is a view in side elevation, but with parts broken away, illustrating a dynamo electric machine having a commutator type rotor and a device embodying my invention.

Fig. 2 is a view in front elevation of a brush-holder assembly particularly embodying my invention, Fig. 3 is a view in front elevation of a brush-holder utilized by me in practicing my invention, Fig. 4 is a view in radial section therethrough taken on the line IV—IV of Fig. 3.

Fig. 5 is a view in tangential section through the brushholder of Fig. 3 taken on the line V—V thereof.

Fig. 6 is a view in section through a condenser structure utilized by me,

Fig. 7 is a view in lateral section therethrough taken on the line VII—VII of Fig. 6, Fig. 8 is a view in longitudinal section through the condenser structure of Fig. 6, taken on the line VIII—VIII thereof, and, Fig. 9 is a diagram of connections showing the apparatus embodying my invention as applied to a shunt wound machine.

It has been found that when a dynamo electric machine of the commutator type is operating, it may cause more or less radio interference or in other words that certain parts and conditions of operation thereof may radiate high frequency oscillations affecting radio receiving or transmitting apparatus, particularly the receiving apparatus. The motors particularly referred to may, for instance, be those utilized in motor driven domestic appliances such as food mixers, vacuum cleaners, washing machines, ironers, etc. There is always a possibility of momentary interruptions in the circuit between the brush or brushes and the commutator segments and these momentary interruptions will result in oscillations deleteriously affecting radio receiving apparatus.

Referring now to Fig. 1 of the drawing, I have there illustrated a dynamo electric machine 11 which is provided with a stator structure 13, a field winding 15, a housing 17, as well as a pair of bearing brackets 19 and 21, all of the hereinbefore enumerated elements constituting more particularly the stator structure thereof.

Machine 11 includes also a rotor designated generally by the reference character 23 and including a set of rotor laminations 25, a winding 27 and a commutator 29, all of which are mounted in a manner well known in the art on a rotor shaft 31.

The bearing brackets 19 and 21 are respectively provided with bearing structures 33 therein, only one of which is shown, comprising anti-friction or ball bearings and while specific embodiments of bearing brackets and bearing structures have been illustrated, my invention is not directly concerned therewith and these parts have been shown for illustrative purposes and in order to illustrate and describe the parts more particularly embodying my invention.

A rocker ring 35 may be of the kind shown in Fig. 1 of the drawing, in section, and may comprise a radially extended flat portion, together with a longitudinally or axially extending portion 37, which latter portion is adapted to interfit with a flange portion 39 integral with bearing bracket 21. A means for adjustably fixing the position of the rocker ring 35 may comprise a headless set screw 41 which has screw threaded engagement with the bearing bracket 21 at one portion thereof.

I provide a pair of brushholders 43 which, as shown in the drawing, may be identical and comprise a hollow casting having a flat rear face 45 and a recess 47 in the rear portion thereof. An integral extension 49 has an opening 51 therein for receiving a brush 53 which is adapted to be spring pressed against the commutator 29 by means not shown in the drawing but well known in the art.

The rear face 45 of the respective brush holders 43 are adapted to be located against the outer face of a flat ring 55 of electric-insulating material which is secured against the flat radial face of rocker ring 35 by any suitable means not particularly shown in the drawing. Suitable clamping bolts 57 may extend through lateral projections 59 of the brushholder 43 and have screw threaded engagement with the ring 55 of electric insulating material. Any suitable equivalent construction of means for insulatedly supporting the pair of brushholders from the metal rocker ring 35 may be utilized by me in practicing my invention.

A condenser 60 comprising a plurality of layers 61 of electric-insulating material and cooperating and interleaved sheets of metallic foil 63 are arranged in any suitable or desired manner to provide two bare terminal portions 65 and 67 of the two metallic sheets 63, one terminal portion of which is adapted to be in electrical engagement with the inner surface of the wall of recess 47 while the other terminal portion is adapted to be in electric conducting engagement with the rocker ring 35, an opening 69 being provided in the ring 55 of electrical-insulating material, immediately beneath a brushholder, and the condenser 60 having a part of its structure located in said opening in the ring 55 of electrical insulating material.

I provide further a pair of current conducting leads 71 and 73, one end of each of which is suitably electrically connected with one of the brushholders 43, a portion thereof being wound to a helical form as is shown more particularly in Fig. 2 of the drawing. I may use a relatively small number of turns for each helix, and I have shown six such turns but do not desire to be limited thereto, since this number of turns may vary for different kinds of dynamo electric machines. The outer ends of the respective conductors 71 and 73 may be held by a clip or clamp 75 secured against the outer face of ring 55 as by a screw 77, and I may use the clamping screw 77 as one of the means for clamping the ring 55 against the rocker ring 35. A second opening 79 may be provided in the ring 55 for receiving a second clamping screw for holding the ring 55 against the rocker ring 35.

The diagram of connections in Fig. 9 of the drawing will indicate the preferred method of connection of the two filter circuits constituted by the series connected air core reactors 71 and 73 and a condenser connected between the cooperating brushholder and the frame of the machine. It is obvious that with the construction hereinbefore described and the location of the condenser in the recess 47 in each of the brushholders 43, one terminal of the condenser is connected to the brushholder while the other terminal of the same condenser is connected to the frame of the machine. The air core reactors may be connected between the respective brushholders and the terminals of the machine. While I have illustrated a shunt wound machine, my invention is not limited thereto since it can be applied to series wound machines or compound wound dynamo electric machines.

The construction hereinbefore described and as shown in the drawing uses the shortest possible current path for the high frequency oscillations which may occur, between the brushholder and the frame of the machine. This path is substantially entirely enclosed in and by metal, and, therefore, cannot radiate radio frequency energy. Under certain conditions, the use of the air core reactors may be dispensed with since the series field coil sections themselves may operate in the same manner and for the same purpose, namely, to either entirely prevent radio frequency oscillations from the machine into the surrounding air or to entirely prevent such oscillations.

While I have illustrated and described a specific embodiment of a device embodying my invention, I do not desire to be limited to the specific details shown and described herein, since modifications may be made therein without departing from the spirit and scope of my invention.

I claim as my invention:

1. A brushholder assembly for a commutator machine having a frame, comprising in combination a metal plate, means for electrically connecting the metal plate to the frame, a plate of electric-insulating material having a recess therein secured to the metal plate, a metal brushholder having a recess in one end registering with the recess in the plate of electric-insulating material and secured thereagainst and a condenser located in said registering recesses and having one terminal in electrical contact with the brushholder and its other terminal in electrical contact with the metal plate.

2. A brushholder assembly for a commutator machine having a frame, comprising in combination, a metal rocker ring electrically connected to the frame, a metal brushholder, a plate of electric-insulating material between the metal rocker ring and the brushholder and a condenser in the brushholder having one terminal in contact with the brushholder and the other terminal in contact with the rocker ring.

3. A brushholder assembly for a dynamoelectric machine having a commutator and a frame, comprising in combination, a metal plate electrically connected to the frame, a plate of electric-insulating material having an opening therethrough, a metal brushholder having a recess in one end thereof, said recess registering with the opening in the insulating plate, means securing the electro-insulating plate to the metal plate and the brushholder to the electric-insulating plate and a condenser in the opening in the insulating plate and the recess in the brushholder and having its terminals electrically engaging the metal plate and the brushholder respectively and completely enclosed by the metal plate, the brushholder and the electric-insulating plate.

4. A brushholder assembly for a commutator machine having a frame, comprising in combination, a metal rocker ring electrically connected to the frame, a metal brushholder, a plate of electric-insulating material between the metal rocker ring and the brushholder and means constituting a non-energy-radiating high frequency ground between the brushholder and the frame located within the brushholder.

5. A brushholder assembly for a dynamo-electric machine having a commutator and a frame, comprising in combination a metal member supported by and electrically connected to the frame, a plurality of metal brushholders insulatedly mounted on the metal member and means located within and encased by the respective brushholders constituting a non-energy radiating high frequency ground between the respective brushholders and the frame.

6. A brushholder assembly for a dynamo-electric machine having a commutator and a frame, comprising a metal brushholder having a recess in one end thereof, means for supporting said brushholder, a condenser in the recess in the brushholder having one terminal thereof in electrical engagement with the brushholder and the other terminal electrically connected with the frame.

7. A brushholder assembly for a dynamo-electric machine having a frame and a commutator, comprising in combination, a metal member supported by and electrically connected to the frame, a plurality of recessed metal brushholders insulatedly mounted on the metal member, and a condenser in the recess in the respective brushholders having one terminal in electrical contact with the brushholder and the other terminal in electrical contact with the metal member.

DONALD G. LITTLE.